Dec. 28, 1948.  C. R. ABRAHAM  2,457,620
MEANS AND METHOD OF INDICATING ACCELERATION
Filed June 26, 1942

INVENTOR.
CHARLES R. ABRAHAM.
BY
*Lippincott & Metcalf*
ATTORNEYS.

Patented Dec. 28, 1948

2,457,620

UNITED STATES PATENT OFFICE 2,457,620

MEANS AND METHOD OF INDICATING ACCELERATION

Charles R. Abraham, San Francisco, Calif.

Application June 26, 1942, Serial No. 448,697

2 Claims. (Cl. 175—183)

My invention relates to a means and method of indicating motion and more particularly to electronic means by which motion can be indicated in terms of acceleration, or rate of change of motion.

Among the objects of my invention are: To provide a means and method of electronically indicating motion, more particularly, rate of change thereof; to provide a motion sensitive electronic tube; to provide a method of indicating the change in motion of an electron source; and to provide a relatively simple, motion sensitive electronic tube capable of use in indicating acceleration and deceleration of apparatus associated therewith.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

Referring to the drawing.

Figure 1:
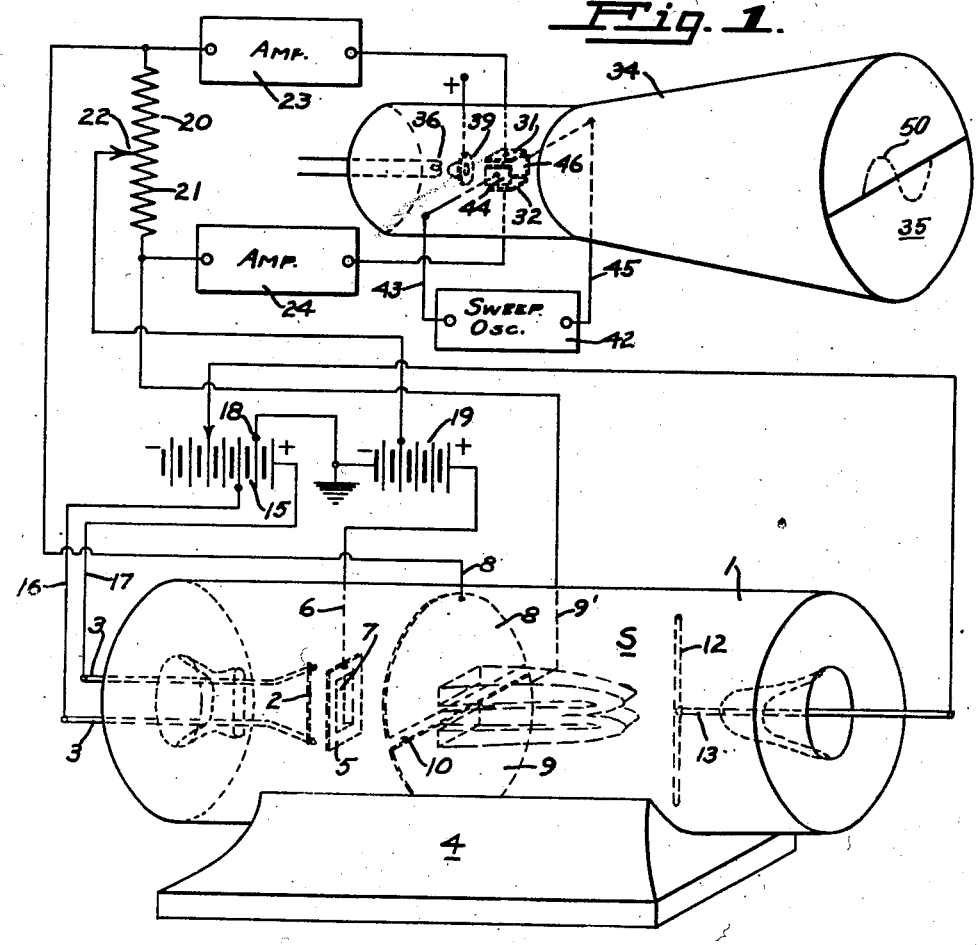
Fig. 1 is a diagram showing one form of motion sensitive tube employable in accordance with the teachings of my invention, such tube being illustrated in diagrammatic perspective, together with a circuit diagram reduced to lowest terms connecting the output of the tube to an indicator such as a cathode ray tube.

While I will describe a simplified embodiment of my invention as set up for indicating rate of change of motion of reciprocating parts such as, for example, pump pistons, poppet valves and the like, it will be obvious to those skilled in the art that my invention has many applications where it is desired to measure acceleration and deceleration. It also will be obvious that by the addition, if desired, of integrating output circuits, the output of the tube may be utilized to indicate speed, as is well known in the art. Others applications of my invention will doubtless occur to those skilled in the art. Consequently I do not wish to be limited to any particular manner by which my invention is used to measure rate of change of motion.

Referring directly to the drawing for a better understanding of a simplified embodiment of my invention exemplifying my method, an electron sensitive tube is provided having an elongated envelope 1 supporting a diametrically extending electron emitter 2 mounted on current supply leads 3 passing through one end of envelope 1. The entire envelope may be mounted on a base 4 in a position parallel to the longitudinal axis of the tube. The emitter can be of the filamentary type, as shown, or if desired, may be an indirectly heated type, as is well known in the art.

Axially positioned on one side of filament 2 is a collimating beam projecting anode 5 supported on anode lead 6 sealed through the side wall of the envelope. This beam anode is provided with a diametrically elongated aperture 7.

Still further axially disposed in the tube beyond anode 5 is a pair of coplanar output anodes 8 and 9 supported on lead wires 8' and 9' respectively. Each of this pair of output anodes is substantially semicircular. Their edges are adjacent and parallel to form a diametrical slit 10 positioned at a right angle to aperture 7 of the beam anode 5. At the opposite end of the tube envelope is mounted retardation electrode 12 extending diametrically at a right angle to slit 10 and supported by lead 13.

Cathode 2 is heated by cathode battery 15 through cathode wires 16 and 17, and a center tap 18 is taken therefrom, grounded and led to beam anode 5 through positive potential source 19.

Output anodes 8 and 9 of the tube are respectively connected to a positive voltage on potential source 19 through joined output resistors 20 and 21 respectively and a variable tap 22 at a position providing an equal positive potential on output anodes 8 and 9. Retardation electrode 12 is connected to cathode battery 15 at a point providing a negative retardation potential on electrode 12.

Resistors 20 and 21 are connected to energize amplifiers 23 and 24 respectively, the respective outputs of these amplifiers energizing opposite deflection plates 31 and 32 mounted in a cathode ray tube envelope 34, this envelope having a viewing screen 35 at one end thereof, and a source of electrons 36 mounted on the other end thereof, the cathode ray beam being produced by cathode ray anode 39, as is customary in the art, to produce a beam providing a luminous spot on screen 35.

In order that the cathode ray beam may have two dimensions on screen 35, a sweep-circuit oscillator 42 is provided, one side 43 of the output thereof leading to sweep deflection plate 44, the other side 45 of the output leading to opposite sweep deflection plate 46. Deflection plates 44 and 46 are placed at right angles to deflection plates 31 and 32, as is well known in the art. The entire cathode ray tube indicating circuit is, of course, conventional and other forms of indicator are deemed fully equivalent.

In operation, all elements of tube 1 and the cathode ray tube 34 are energized. The potentials on the electrodes of tube 1 are adjusted so that the electron beam therein, collimated by aperture 7 and slit 10, is projected through these apertures outwardly into space S beyond output anodes 8 and 9 and toward retardation elecrode 12. The relative potential between the output anodes 8 and 9 and retardation electrode 12 is adjusted so that the electron beam is retarded as it approaches electrode 12, to the point of being stopped in space and then returned to the output anodes to be collected thereby.

When the tube elements have been properly alined within the tube, the electrons in the beam passing through slit 10 will fall in substantially equal amounts on plates 8 and 9. If any difficulty is encountered in splitting the beam equally between plates 8 and 9, auxiliary deflection plates (not shown), positioned between acceleration anode 5 and output anodes 8 and 9, may be utilized, and the potential thereon varied until the beam divides equally upon anodes 8 and 9 with equal potentials on these anodes. Under these conditions the tube is ready for use as a motion sensitive tube, and can be utilized to measure acceleration. The tube is then attached, as by base 4, to the reciprocating part whose accelerations it is desired to indicate, with the longitudinal axis of the tube at a right angle to the line of motion of the reciprocating part, and with the slit 10 also at a right angle to this motion.

When the tube is at rest, the electron beam is projected directly along the center of the tube, and the currents collected by anodes 8 and 9 are in balance, producing no energy to operate the cathode ray tube. Considering the tube when it is being accelerated in either direction, the beam electrons, while still in the cathode, experience this change in motion. As soon, however, as they pass slit 10 they are freed from all forces having only those velocities which existed at the time of leaving the cathode and they are traveling in space S which has substantially equipotential cross-sectional fields. The force which is accelerating the tube can no longer act upon the electrons in space S, so that in a given period of time during which a tube acceleration is occurring, the tube will move a greater distance along the line of travel than the electron in space S. Consequently, the electron beam in space S will be displaced in a direction opposite to that in which the change in speed occurs, so that a greater number of electrons will return to one or the other of the collecting anodes 8 and 9, in accordance with the direction of motion. The current through resistors 20 and 21 becomes unbalanced and the cathode ray beam will be deflected.

As soon as tube acceleration ceases, the electron beam will again return to its central position with the electrons divided equally between plates 8 and 9. The output will again be in balance. Acceleration in the opposite direction will reverse the output and move the cathode ray tube beam in the opposite direction.

Sweep circuit oscillator 42 is preferably tuned to the frequency of oscillation of the part to which tube 1 is attached. Consequently a diagram 50 will be produced on the cathode ray tube screen, whose amplitude above and below the center line will indicate acceleration and deceleration respectively on up and down strokes of the part being investigated.

It will be noted that the electrons passing through slit 10 are retarded to zero velocity at the outermost points of their travel, and are therefore completely free at that point from any and all acceleration forces, just so long as the cross-sectional fields between plates 8 and 9 and electrode 12 remain constant.

The entire operation of the device may be roughly compared to the operation of a water jet projected vertically into the air from a nozzle, with water collecting receptacles positioned and attached on each side of the nozzle. If the nozzle is then moved suddenly, in either direction along a line joining the buckets and the nozzle, the water will not fall back uniformly into both buckets, but will follow in space its original path and fall into one or the other of the buckets in accordance with the direction of motion of the nozzle. The difference between the two received currents in the tube, as above described, is a measure of acceleration, and the cathode ray tube will therefore indicate acceleration and deceleration.

Curve 50 produced on the cathode ray tube screen will therefore give complete information as to the acceleration and deceleration on both strokes of a part, such as high speed pump pistons and poppet valves, for example, whose performance it is desired to indicate.

I wish it to be distinctly understood, however, that I do not wish to be limited to the reflexed type of path, as a straight path from beam projecting anode 5 to collecting anodes 8 and 9 may be utilized, together with retardation electrode means positioned between beam projecting anode 5 and the output electrodes 8 and 9 energized to retard the electrons so that the beam electrons may be sufficiently slowed down and sufficiently relieved of their controlling fields so that the electrons can be relatively displaced within the limits of the tube accelerations applied. Experimental evidence indicates that such straight line beam tubes become operative at electron velocities on the order of $1 \times 10^2$ cm. per second.

When the tubes of the type described are employed in a system to indicate acceleration, axial movement of the tube should be avoided, for this, if it occurred, might change the effective response and differential effect of the beam on anodes 8 and 9 and introduce errors. To avoid any possibility of this, it is preferred that a double ended tube be utilized with two beams projected in opposite directions in order that any effect of axial displacement be neutralized.

Figure 2:
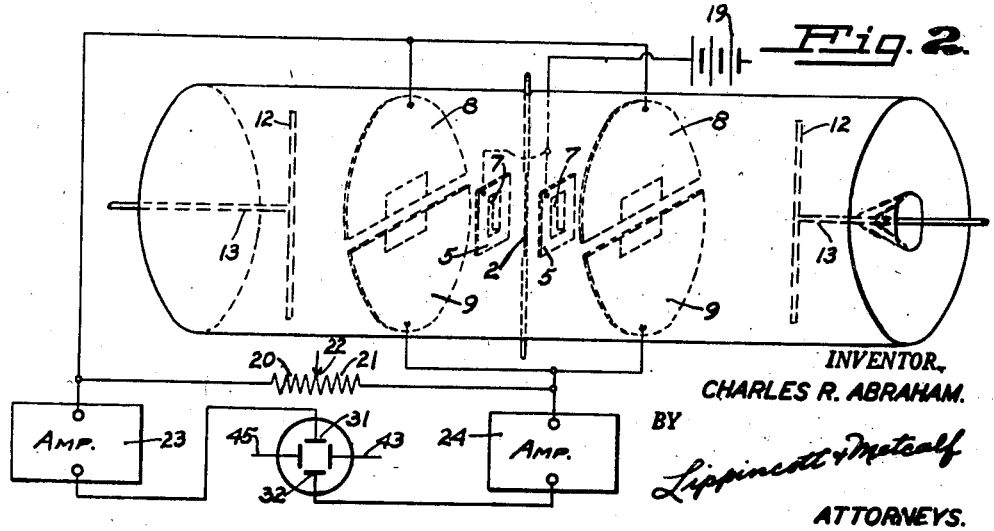
Fig. 2 is a modification of my invention.

Fig. 2 shows such a double ended tube designed to function along the lines of the tube of Fig. 1. It is essentially the equivalent of two tubes back to back, but permits of the utilization of a common filament and offers the advantage of balanced operation. In this figure, corresponding electrodes have been designated by similar reference numerals, and are preferably operated in parallel when the tube is utilized in a circuit such as disclosed in Fig. 1.

My system and method of electron control, therefore, can be utilized to produce an output in terms of acceleration, and this output can be used in many different ways to obtain useful information.

In lieu of slowing up the electrodes as by anode 12, any means for delaying the arrival of the electrons at their destination may be resorted to. Thus, for example, by causing the electron beam to follow a zig-zag or other tortuous path, the same time delay may be introduced.

I claim:

1. In combination, an acceleration responsive device comprising an envelope including a source of electrons, anode means for projecting a beam of electrons into space, means for retarding said electrons in said space, collecting anodes symmetrically disposed with respect to the path of said beam and extending normally to said path, said collecting anodes having adjacent spaced edges, means for energizing said collector anodes to substantially the same positive potential to collect beam electrons in substantially equal amounts when said source of electrons is at rest, and in unequal amounts when said source is accelerated in a direction normal to both said beam path and said collector anode edges; and apparatus having movement; said acceleration-responsive device being affixed to said apparatus with both said beam path and said adjacent spaced edges of said anodes disposed substantially normal to the direction of such acceleration.

2. In combination, an acceleration responsive device comprising an envelope including a source of electrons, anode means supported to either side of said source of electrons for projecting beams of electrons into space in opposite directions, means for retarding the flow of said electrons in space, a pair of collecting anodes to either side of said source of electrons and symmetrically disposed relative to the paths of their associated beams, said collecting anodes having adjacent spaced edges extending normally to said beam paths, and means for energizing the collector anodes of each pair to substantially the same positive potential to collect beam electrons in substantially equal amounts on the anodes of each pair when said source of electrons is at rest, and in unequal amounts when said source is accelerated in a direction normal to said beam paths and to said adjacent spaced edges; apparatus having movement; said acceleration-responsive device being affixed to said apparatus with both said beam paths and said adjacent spaced edges of said anodes disposed substantially normal to the direction of such movement; said source, anode means, retarding means and collecting anodes constituting means for imparting to said electrons, a velocity sufficiently slow to provide useful displacement within the limits of the tube acceleration applied thereto, said velocity being at least $1 \times 10^2$ centimeters per second.

CHARLES R. ABRAHAM.

REFERENCES CITED

The following references are of record in the file of this patent:

UNITED STATES PATENTS

| Number | Name | Date |
|---|---|---|
| 1,096,942 | Owens | May 19, 1914 |
| 1,319,036 | Barus et al. | Oct. 21, 1919 |
| 2,025,580 | Engelhardt | Dec. 24, 1935 |
| 2,027,393 | McCreary | Jan. 14, 1936 |
| 2,075,379 | Varian | Mar. 30, 1937 |
| 2,086,271 | Jobst et al. | July 6, 1937 |
| 2,103,507 | Zworykin | Dec. 28, 1937 |
| 2,185,135 | Schlesinger | Dec. 26, 1939 |
| 2,193,910 | Wilson | Mar. 19, 1940 |
| 2,208,648 | Schrader | July 23, 1940 |
| 2,246,259 | Machts | June 17, 1941 |
| 2,254,095 | Thompson | Aug. 26, 1941 |
| 2,314,302 | Ziebolz | Mar. 16, 1943 |
| 2,344,679 | Crosby | Mar. 21, 1944 |
| 2,358,901 | Ziebolz | Sept. 26, 1944 |